(12) United States Patent  
Hara

(10) Patent No.: US 8,640,527 B2
(45) Date of Patent: Feb. 4, 2014

(54) PIPELINE LEAKAGE-SENSING DEVICE

(76) Inventor: Elmer H. Hara, Regina (CA)

( * ) Notice: Subject to any disclaimer, the term of this patent is extended or adjusted under 35 U.S.C. 154(b) by 857 days.

(21) Appl. No.: 12/162,989

(22) PCT Filed: Feb. 2, 2007

(86) PCT No.: PCT/CA2007/000149
§ 371 (c)(1),
(2), (4) Date: Jul. 13, 2010

(87) PCT Pub. No.: WO2007/087720
PCT Pub. Date: Aug. 9, 2007

(65) Prior Publication Data
US 2010/0269941 A1    Oct. 28, 2010

Related U.S. Application Data

(60) Provisional application No. 60/764,335, filed on Feb. 2, 2006.

(51) Int. Cl.
*G01M 3/38*    (2006.01)

(52) U.S. Cl.
USPC .............................. 73/52; 73/40.5 R; 73/49.1

(58) Field of Classification Search
USPC ........................................ 73/40.5 R, 49.1, 52
See application file for complete search history.

(56) References Cited

U.S. PATENT DOCUMENTS

| 3,721,898 | A | | 3/1973 | Dragoumis |
| 3,980,807 | A | * | 9/1976 | Woytiuk ....................... 174/107 |
| 4,161,419 | A | * | 7/1979 | Alia ................................ 156/51 |
| 4,271,120 | A | | 6/1981 | Michaud |
| 4,842,553 | A | * | 6/1989 | Ingram ......................... 439/583 |
| 5,477,018 | A | | 12/1995 | Fries et al. |
| 6,272,903 | B1 | | 8/2001 | Shafer |
| 2004/0154380 | A1 | | 8/2004 | Walker |

FOREIGN PATENT DOCUMENTS

| CA | 2076070 A | 2/1993 |
| GB | 2100420 A | 12/1982 |
| JP | 59-105533 A | 6/1984 |

OTHER PUBLICATIONS

International Search Report for PCT/CA2007/000149 dated May 18, 2007, 5 pages.

* cited by examiner

*Primary Examiner* — Hezron E Williams
*Assistant Examiner* — Paul West
(74) *Attorney, Agent, or Firm* — Gowling Lafleur Henderson LLP

(57) ABSTRACT

A leakage-sensing device for installation adjacent to a pipeline configured for conveying liquid or gaseous chemical materials. The leakage-sensing device comprises a length of cable configured to transmit and back-reflect signals. The cable is communicable with a signal-measuring device. The entire length of cable is encompassed by a torsioned and tensioned coiled biasing means. The cable and the torsioned and tensioned coiled biasing means are embedded in a chemically frangible casing material. The chemically frangible material is selected for its structural instability when contacted with the selected chemical material to be conveyed within the pipeline thereby releasing the torsioned and tensioned biasing means which subsequently imparts bending and/or twisting and/or elongating and/or contracting forces to the cable thereby causing the cable to physically interfere with and/or deform and/or break the transmission and back-reflection of signals along the cable.

31 Claims, 8 Drawing Sheets

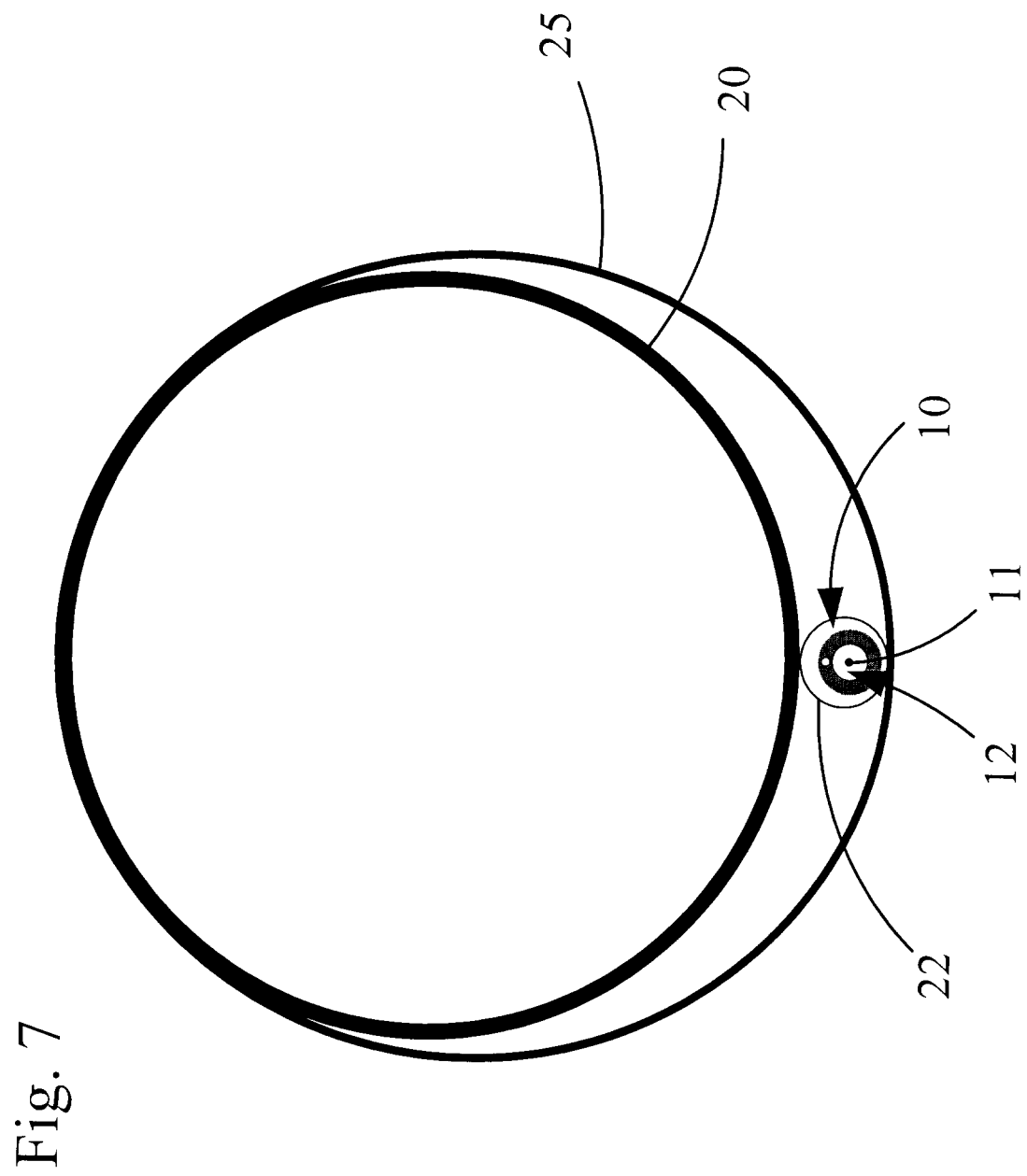

PIPELINE LEAKAGE-SENSING DEVICE

CROSS-REFERENCE TO RELATED APPLICATIONS

The present application is a national phase application under 35 U.S.C. § of International Patent Application No. PCT/CA2007/000149, filed Feb. 2, 2007, which claims priority to U.S. Provisional Patent Application No. 60/764,335, filed Feb. 2, 2006. The entire contents of these applications are incorporated by reference.

TECHNICAL FIELD

This invention relates to leakage-sensing devices for monitoring of piping infrastructures. More particularly, this invention relates to the use of fiber optic cables as leakage-sensing devices for long-distance piping infrastructures.

BACKGROUND ART

The construction and use of long-distance transcontinental pipelines for transmission of liquid and gaseous hydrocarbon fuel stocks is rapidly increasing throughout the world. Such pipelines are used to convey crude liquid energy products from remote terrestrial and deep-sea drilling sites to refineries, from where extensive long-distance piping infrastructures are used to deliver refined liquid energy products to urban and/or industrial areas for redistribution by local piping infrastructures or overland by tank trucks. Long-distance piping infrastructures are also used for transcontinental conveyance of natural gas and liquefied natural gas. As world energy demands increase, the pace of construction of such pipelines is expected to increase. United States, for example, has over 400,000 miles of natural gas delivery pipelines in place and is expected to increase this infrastructure by 50% during the next twenty years (Sivathanu, Technology Status Report on Natural Gas Leak Detection in Pipelines prepared for the US Dept. of Energy, Contract No. DE-FC26-03NT41857).

There are significant and potentially catastrophic human and environmental safety risks associated with leakage of such hydrocarbon fuel stocks from long-distance transmission pipelines as a consequence of pipe cracking due to materials fatigue, to defective joints, and accidental or deliberate physical encroachments and resulting damage. Consequently, a wide variety of methods are employed to routinely inspect and monitor these piping infrastructures for leakage. Above ground liquid transmission pipelines can be monitored by visual inspections from low-flying aircraft while gas pipelines can be monitored by aircraft equipped with infra-red sensing instruments. Another method for monitoring long-distance pipelines for leakage is to measure differences in flow-volumes between adjacent pumping stations. Satellite-based hyperspectral techniques are also used for routine monitoring. Such methods are typically suited for detection of large leakages and therefore are more useful for spotting and locating significant pipeline breaks and are not capable of detecting small leaks. Another problem with such monitoring methods is that the detected leakages must be confirmed by on-site visual inspections, Furthermore, such overhead monitoring methods are not useful for monitoring leakage from underground transmission piping or for transmission piping connecting deep sea drilling rigs to land-based depots and refineries.

Considerable efforts have been placed during the past two decades on the development of passive leakage-sensing devices that are based on: (a) the use of sound-wave systems, light-wave systems, combination heat & light-wave systems that transmit signals between signal sources and signal receivers, and (b) the detection and measurement of physical interference by leaked materials with the transmission of the signals within these types of systems. Such passive leakage-sensing devices are typically configured as cable systems which are placed adjacent to or in very close proximity to pipelines. The transmission of signals and any interferences with signal transmission are constantly monitored by remote signal processing equipment and instruments. Examples of such systems currently in use include acoustic monitoring systems, millimeter wave radar systems, infrared thermography, and various fiber-optic systems such as single-wave continuous-emission laser systems, single-wave pulsed laser systems, multi-wave pulsed laser systems, and distributed temperature sensing (DTS) optical systems.

Many light-wave-based systems typically comprise an optical time domain reflectometer (OTDR) which includes a light source for emitting pulsed signals. The OTDR is an instrument commonly used in the fiber optics industry for receiving and analysis of back-reflected light signal transmissions. The systems generally function by the emission of a pulsed laser light source into and subsequent transmission along a fiber optic waveguide. The light energy is reflected within the fiber optic waveguide back toward the source, but is diverted by a beam splitter which typically redirects about 50% of the reflected light energy into the OTDR's detection and recording section wherein the intensity of the reflected light is measured and recorded. Any interference with the flow of light energy along the fiber optic cable will be detected and measured by the OTDR. Significant changes in OTDR values when compared to reference values (i.e. previous measurements of reflected light), can be used to identify leakage events. The advantages of such passive leakage-sensing devices include relatively inexpensive to install, they don't interfere with the operation of pipelines, and can be continuously monitored by mobile or fixed stations. However, the disadvantages inherent with these types of passive leakage-sensing devices is that the systems typically have a high rate of false alarms, and that the instrumentation, processing and staffing required for continuous monitoring are expensive to install and operate. Although fiber optic light-based systems are useful for detecting occurrence of leakages in pipelines, it is difficult with the current state-of-the art systems, to precisely pinpoint pipeline leakage locations within long-distance ranges. Discrete fuse-block technologies have been developed to cut or bend light transmission along fiber optic waveguides in response to pipeline leakage; see for examples UK Patent Application No. GB 2 100 420 A, and MacLean et al., 2003 In Sensors and Actuators A, vol. 109, pages 60-67. However, such fiber optic leakage-sensing devices are expensive to manufacture, are difficult to replace after leaking pipe sections have been repaired or replaced, and do not enable precise identification of leakage locations, i.e., to within 1 meter or less, unless the sensing devices are installed at spacings of 1 m or less which will significantly increase the cost of the detection system.

DISCLOSURE OF THE INVENTION

The exemplary embodiments of the present invention, at least in preferred forms, are directed to leakage-sensing devices for installation alongside long-distance piping infrastructures for detection of leakage of liquids or gases from said piping infrastructures.

According to one preferred embodiment of the invention, there is provided an integral body-fused device for detecting leakage of selected gases and/or liquids from pipelines. The device comprises a stressed coiled spring which is embedded in a chemically frangible material thereby forming an integral body-fused matrix for encompassing a cable configured to transmit signals. Exemplary cables include those configured to transmit light energy or radar signals or electrical energy or acoustic wave signals or chemical signals. The coiled spring may be stressed by the application of a compressive force, e.g., a torsional force during manufacture of the leakage-sensing device. Alternatively, the coiled spring may be stressed by the application of a tensile, e.g., a stretching force during the manufacturing process. The integral body-fused fiber optic leakage-sensing device is disposable adjacent to and about a pipeline wherein liquid or gaseous materials are conveyed.

According to another preferred embodiment of the invention, there is provided an integral body-fused fiber optic device for detecting leakage of selected gases and/or liquids from pipelines. The device comprises a fiber optic cable cooperating with a fiber optic waveguide. The fiber optic waveguide is encompassed along its entire length with a tensioned coiled spring which is embedded in a chemically frangible material, thereby forming an integral body-fused matrix encompassing the fiber optic cable containing therein the fiber optic waveguide. The coiled spring may be stressed by the application of a compressive force, e.g., a torsional force during manufacture of the leakage-sensing device. Alternatively, the coiled spring may be stressed by the application of a tensile, e.g., a stretching force during the manufacturing process. The integral body-fused fiber optic leakage-sensing device is disposable adjacent to and about a pipeline wherein liquid or gaseous materials are conveyed.

According to one aspect, the chemically frangible material is selected for its known property of being physically degradable by a selected chemical molecule. By physically degradable, it is meant that the physical matrix of the chemically frangible material will be progressively destabilized by prolonged exposure to the selected chemical molecule, to beyond the point of disintegration and/or dissipation and/or dissolving thereby releasing the stressed coiled spring which then consequently biases, twists and unwinds to relieve the stress which had been applied to the coiled spring during manufacture of the leakage-sensing device. The biasing, twisting, and unwinding movements of the coiled spring during relief of the stress causes the fiber optic cable to bend and undulate thereby applying twisting and bending pressures to the fiber optic waveguide contained therein thereby resulting in leakage and/or cutting of the light energy transmitted within the fiber optic waveguide, and ultimately, in cutting of the fiber optic waveguide. The chemically frangible material is preferably a plastics-type material which is thermostable in temperature ranges that encompass winter and summer environmental extremes for example, in the range of −70° C. to +70° C.

In one aspect, the chemically frangible material is selected for its known property of being physically destabilized by gaseous materials. In a preferred form, the gaseous materials contain methane molecules. In another preferred form, the gaseous materials contain hydrogen sulfide molecules. In yet another preferred form, the gaseous materials contain sulfur dioxide molecules. In a further preferred form, the gaseous materials contain halide molecules, said halide molecules exemplified by chloride molecules. In yet another form, the gaseous materials comprise gaseous molecules containing nitrogen, said gaseous molecules exemplified by ammonia, nitrous oxide and nitrous dioxide. In another aspect, the chemically frangible material is selected for its known property of being physically destabilized by contact and/or immersion in liquids. In a preferred form, the liquids comprise unrefined hydrocarbon-containing fuel stocks. In another preferred form, the liquids comprise refined hydrocarbon-containing fuel stocks and/or products. In yet another preferred form, the liquids comprise water. In a further preferred form, the liquids comprise alcohols.

According to yet another aspect, the fiber optic cable is configured to communicate with a source of laser light pulses which are transmitted along and reflected back along the entire length of the fiber optic waveguide.

According to another embodiment of the present invention, there is provided a pipeline leakage detection system comprising an integral body-fused fiber optic cable, said integral body-fused fiber optic cable concurrently communicating with a source of laser light pulses that cooperates with an optical time domain reflectometer (OTDR) configured to cooperate with a source of laser light pulses and for measuring the intensity of the back-reflected light transmitted by the fiber optic cable.

In a preferred form, the integral body-fused fiber optic cable comprises a fiber optic cable cooperating with a fiber optic waveguide. The fiber optic waveguide is encompassed along its entire length with a tensioned coiled spring which is embedded in a somewhat flexible chemically frangible material, thereby forming an integral body-fused matrix encompassing the fiber optic cable containing therein the fiber optic waveguide. It is preferable that the coiled spring encompassing the fiber optic cable is formed by the torsional winding of a metal rod about the fiber optic cable. It is preferable that the coiled spring produced by the torsional winding of a metal rod about the fiber optic cable is further stressed by the concurrent application of a compressive force during manufacture of the leakage-sensing device of the present invention. Alternatively, the coiled spring may be further tensioned by the application of a tensile force, i.e. a stretching force during the manufacturing process. The chemically frangible material wherein the torsioned and tensioned coiled spring is embedded, is preferably a plastics-type material which is thermostable in temperature ranges that encompass winter and summer environmental extremes as exemplified by the temperature range of −70° C. to +70° C.

According to yet another embodiment of the present invention, the integral body-fused fiber optic leakage-sensing device of the present invention is loosely installable adjacent to and about a pipeline after which, the pipeline and leakage-sensing device are overlaid by a sealable covering for containing therein materials leaking from said pipeline. In a preferred form, the covering is a metal covering. In another preferred form, the covering comprises a plastics material.

According to yet another embodiment of the invention, there are provided multiple collars configured for loosely juxtaposing the integral body-fused fiber optic leakage-sensing device adjacent a long distance pipeline. Each collar is provided with at least one aperture receiving the integral body-fused fiber optic cable therethrough. It is preferable that the collars are a 1-piece configuration comprising a resilient plastics material. Alternatively, each collar may comprise a pair of opposing arms hinged together at one end and is provided with a clasp means for interlocking unhinged ends together. A long distance pipeline provided with said multiple collars receiving therethrough the integral body-fused fiber optic leakage-sensing device, is preferably overlaid by a sealable covering for containing therein materials leaking from said pipeline. In a preferred form, the covering is a metal covering. In another preferred form, the covering comprises a plastics material.

According to a further embodiment of the present invention, there is provided a porous non-frangible conduit for loosely encasing therein the integral body-fused fiber optic leakage-sensing device, to contain but provide sufficient room for the coiled spring to unwind and deform the fiber optic waveguide after the chemically frangible embedding material has been progressively destabilized by exposure to the selected chemical molecule, to beyond the point of disintegration and/or dissipation and/or dissolving. In a preferred form, the porous non-frangible conduit containing therein the integral body-fused fiber optic leakage-sensing device is juxtaposable adjacent a long distance pipeline. In another preferred form, the porous non-frangible conduit containing therein the integral body-fused fiber optic leakage-sensing device is communicable with apertures provided in collars configured to encompass long distance pipelines.

According to a further embodiment of the invention, there is provided means for splicing together and conjoining the end of one integral body-fused fiber optic leakage-sensing device to an end of another integral body-fused fiber optic leakage-sensing device in a manner similar to that of conjoining one end of a telecommunication fiber optic cable to another end of a telecommunication fiber optic cable. The means include equipment and methods known to those skilled in these arts for fusing together cut ends of fiber optic waveguides, plus a moulded two-piece cylindrical coupler comprising the chemically frangible material encompassing the coiled spring configured to enclose the fused ends of fiber optic waveguides to form a contiguous structure with the cut end of the integral body-fuse device. A method is also provided for fusing the coupler with the two integral body-fuse ends. In the alternative, a cylindrical coupler is injection moulded around the fused fiber optic waveguide to form a contiguous structure with the cut ends of the integral body-fused leakage-sensing device.

BRIEF DESCRIPTION OF THE DRAWINGS

The present invention will be described in conjunction with reference to the following drawings, in which:

FIG. 7 is an end view of the embodiment shown in FIG. 6a; and

BEST MODES FOR CARRYING OUT THE INVENTION

Figure 1:
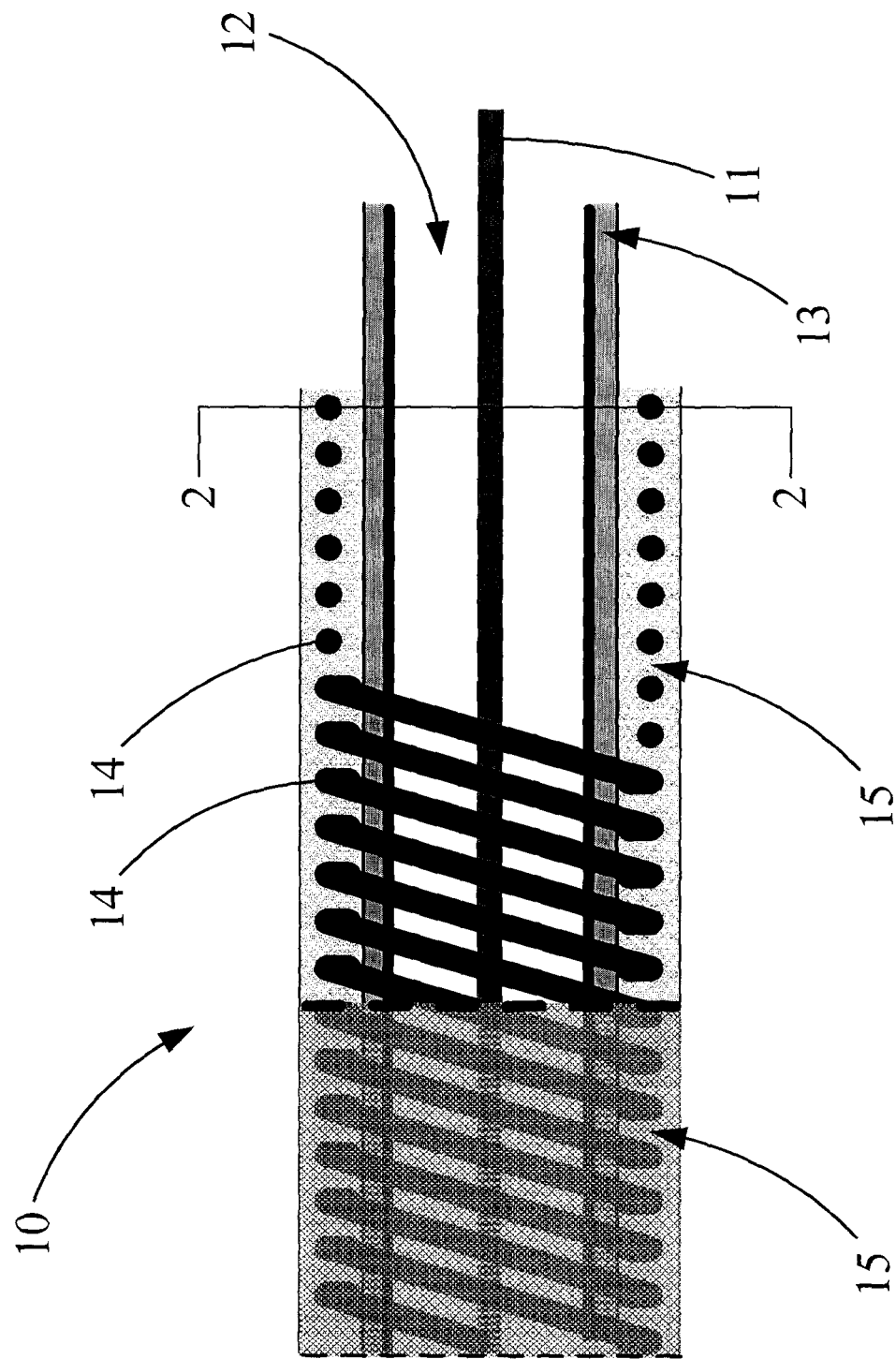
FIG. 1 is a partial cut-away cross-sectional side view of one embodiment of the present invention.
Figure 2:
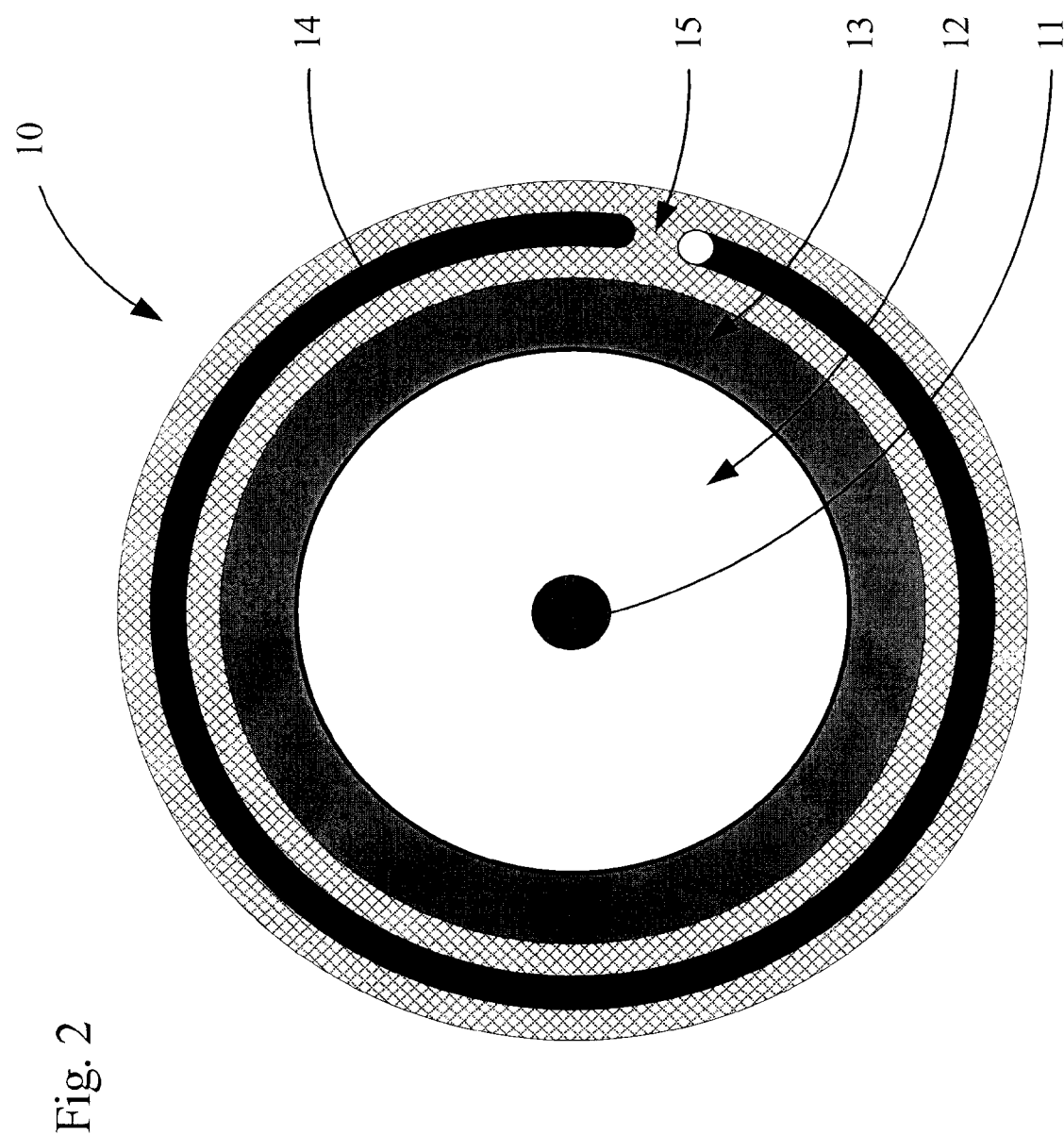
FIG. 2 is an end view of the embodiment shown in FIG. 1.

An exemplary embodiment of the leakage-sensing device of the present invention is shown in the accompanying drawings and is generally referred to by the numeral 10. As can best be seen in FIGS. 1 and 2, the device 10 is provided with a fiber optic waveguide comprising a core 11 encased with a cladding material 12. The fiber optic waveguide is overlaid with a thin layer 13 of a suitable buffering material selected for providing protection to the fiber optic waveguide from mechanical stresses caused by thermal expansion and contraction of the frangible material during manufacture and during responses to environmental changes. The buffer layer 13 is encircled by a tensioned resilient coiled spring 14 which is embedded in place by a chemically frangible material 15. The resilient coiled spring 14 is preferably tensioned during the manufacturing of the leakage-sensing device 10 by the application of a torsional force and a compressing force or alternatively, of torsional force and an elongating force while the chemically frangible embedding material 15 is applied and set in place. It is preferred that the resilient coiled spring 14 comprises a cold-drawn steel as exemplified by high-tensile hard-drawn steel as defined in the American Standards of Materials (ASTM) specification A-679, or music wire according to ASTM A-229, or 302/304 stainless steel according to ASTM A-313. The buffering layer should be sufficiently viscous (i.e. stiff) so that in the case of exposure of the chemically frangible material to a selected chemical material causes destabilization and/or disintegration and/or dissolution of the chemically frangible material, the twisting (i.e., torsioning) and tensile forces generated by the uncoiling spring released from the destabilized chemically frangible material are transmitted to the fiber optic waveguide causing either a microbending of the fiber optic waveguide or a more substansive macrobending of the fiber optic waveguide or alternatively, a combination of microbending and macrobending forces.

The chemically frangible embedding material 15 is preferably liquefiable at high temperatures to facilitate encompassing and embedding of the tensioned resilient coiled spring 14 during the manufacture of the device 10, and then as it is cooled, solidifies into a somewhat flexible but durable solid matrix that is thermostable over selected temperature ranges encompassing environmental temperature extremes, e.g., in ranges between −70° C. and +70° C., and will contain and retain a stressed coiled spring 14. It is preferred that the chemically frangible embedding material 15 is physically stable and impervious to penetration by liquids and gases when the device 10 is installed alongside pipelines except in the situation when certain selected chemical compounds leak from within the pipelines and contact the chemically frangible material. It is to be noted that the composition of the chemically frangible embedding material 15 is selectable according to the application for which the leakage-sensing device of the present invention is to be used. For example, for detecting leakages in pipelines conveying gaseous energy fuel stocks such as natural gas and/or other methane-rich volatilized materials, the embedding material 15 selected should: (a) be susceptible to infiltration by $CH_4$ molecules into its physical matrix after which the chemical bonds (i.e., the structural bonds) between the molecules comprising the structural components of the matrix are increasingly disrupted by increasing levels of $CH_4$ molecules infiltrating the matrix, thus resulting a progressive softening and/or deterioration of the physical matrix of the chemically frangible material 15 to the point where the tensioned coiled spring 14 becomes increasingly exposed and released from the embedding material 15, and (b) be impervious to disruption of its physical matrix by all other types of molecules. Examples of suitable materials that are degradable by gaseous $CH_4$ molecules and therefore useful as chemically frangible embedding materials for the leakage-sensing device of the present invention for use with pipelines used for transmission of natural gas, liquefied natural gas and other methane-rich gaseous products, include butyl rubber (elastomer), ethylene propylene rubber (elastomer), styrene butadiene rubber (elastomer), Lexan® (polycarbonate) (Lexan is a trade mark of General Electric Co.), Cycoloy® (combination of polycarbonate and acrylonitrile butadiene styrene) (Cycoloy® Lexan is a trade mark of Borg-Warner Corp.), and Noryl® (a combination of polyphenylene oxide and styrene) (Noryl® is a trade mark of General Electric Co.). Examples of suitable materials that are degradable by liquid hydrocarbon fuel stocks and therefore useful as chemically frangible embedding materials for the leakage-sensing device of the present invention for use with pipelines used for transmission of liquid hydrocarbon fuel stocks, include butyl rubber, styrene butadiene rubber, synthetic polyisoprene (elastomer), Lexan®, Cycoloy®, and Noryl®.

The leakage-sensing device 10 of the present invention can be manufactured by modification of known processes for manufacturing plastic-coated fiber optic cables or plastic-coated metal wires, wherein the modification comprises incorporation of steps to encompass fiber optic waveguides with coiled springs 14, and to tension and/or torsion said coiled springs 14 before application of liquefied chemically frangible embedding materials to encompass and embed the wire-wound fiber optic waveguide. Those skilled in these arts will understand that such manufacturing processes can produce lengths of a leakage sensing devise configured as described herein.

It is preferable that the leakage-sensing device 10 of the present invention is installed in contact with or alternatively, adjacent to or alternatively, in close proximity to and about the pipeline for monitoring leaks therefrom. It is also preferable that a pipeline provided with the leakage-sensing device 10 is further provided with a sheath for encasing the pipeline and the leakage-sensing device 10.

Figure 3:
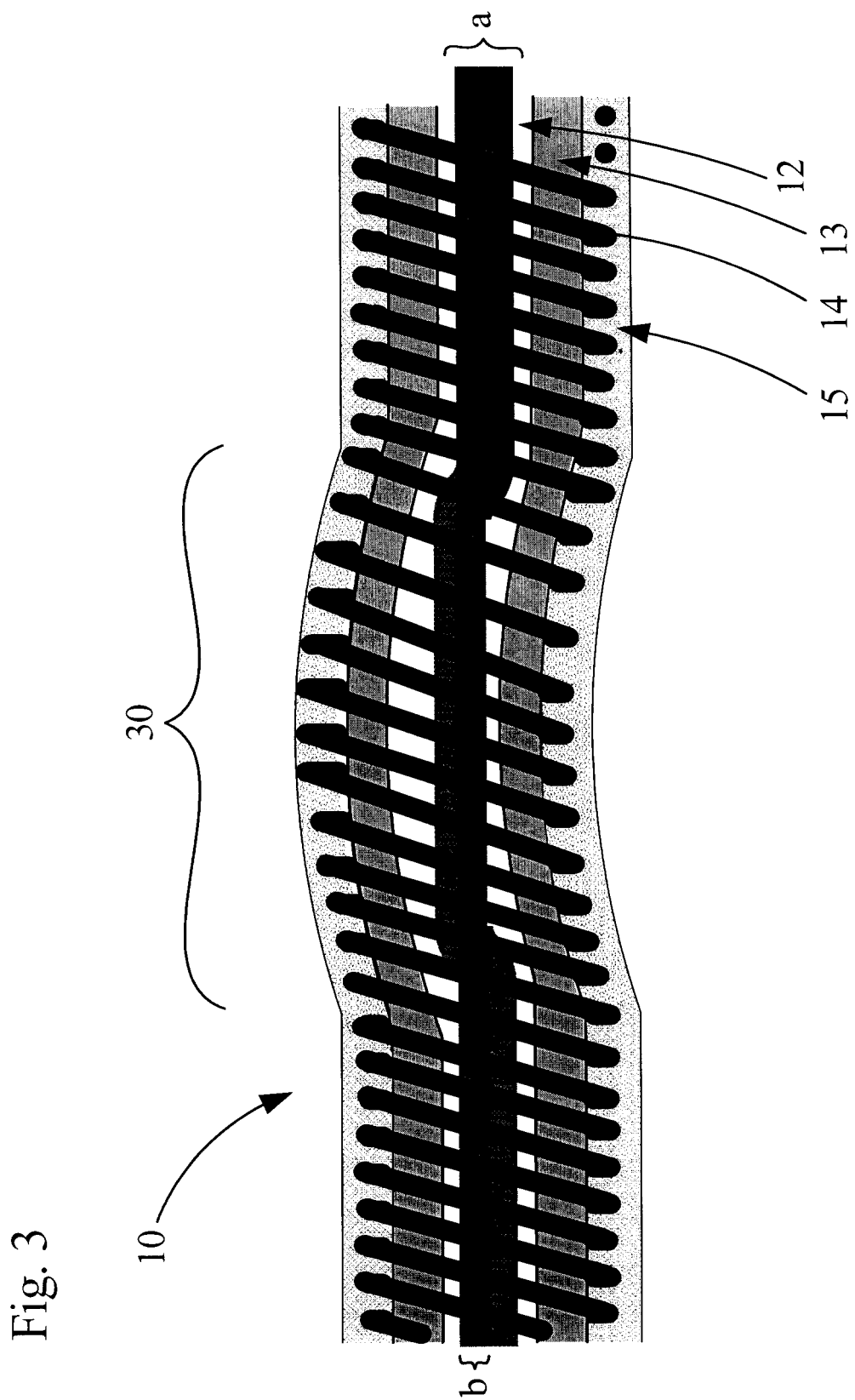
FIG. 3 is a cross-sectional side view of the embodiment shown in FIG. 1 responding to exposure to a very small leak from a pipeline, showing softening of the frangible material and the subsequent partial release of torsioning and tensile forces from the coiled spring, and the resulting distortion of the fiber optic waveguide and reduction of the optical signal strength as schematically (i.e. symbolically) represented by "a" and "b"

In the event that a small leak occurs in a pipeline that the leakage-sensing device 10 has been installed adjacent to, the leaking material will come in contact with the chemically frangible embedding material 15 thereby causing disruption and degradation of the physical matrix of the chemically frangible embedding material 15. FIG. 3 shows the effects of a small and slow leak as may be caused by a hairline fracture or pinhole in a pipeline as a consequence of materials failure, on the leakage-sensing device 10 of the present invention. Exposure of the device 10 to the leaking materials will cause a degradation of a portion 30 of the embedding material 15 thereby releasing the tensioned coiled spring 14.

The coiled spring 14 will move in a direction to reduce the tension imposed during manufacturing of the device 10, e.g., if the spring 14 was compressed as well as placed under a torsional force, then it will concurrently expand and rotate in the direction of tension relief thereby producing an undulating shape caused by the spring 14 pushing against sections of the integral body-fused leakage-sensing device that remain unaffected by the leaking material thereby deforming the fiber optic waveguide 11 that is directly exposed by the degrading embedding material 15. The undulating shape of the uncoiling section of the spring 14 applies tensile and twisting forces to the fiber optic waveguide thereby introducing macrobending and microbending transmission losses in the fiber optic waveguide subsequently causing reduction in the optical power that is transmitted by the fiber optic waveguide. Furthermore, the fiber optic waveguide will be broken when the twisting and tensioning forces caused by the uncoiling spring are large.

Alternatively, if the coiled spring 14 was tensioned by elongation as well as torsioned during manufacture of device 10, then the released spring 14 will tend to contract and at the same time rotate in the direction of tension relief. If the integral body-fused leakage-sensing device is installed with some looseness (i.e. slack), the sections of the device that are unaffected by the leaking material will be pulled closer together and force the fiber optic waveguide to take on an undulating form which introduces macrobending and microbending transmission losses in the fiber optic waveguide thereby causing reduction in the optical power that is transmitted by the fiber optic waveguide. Furthermore, the fiber optic waveguide will be broken when the twisting force caused by the uncoiling spring becomes large. The reduction in the optical power transmitted by the fiber optic waveguide is shown schematically in FIG. 3 whereby the optical power from the source light is represented by "a" and the diminished optical power after traversing the section of the fiber optic waveguide with macro bending and microbending losses is represented by "b".

Figure 4:
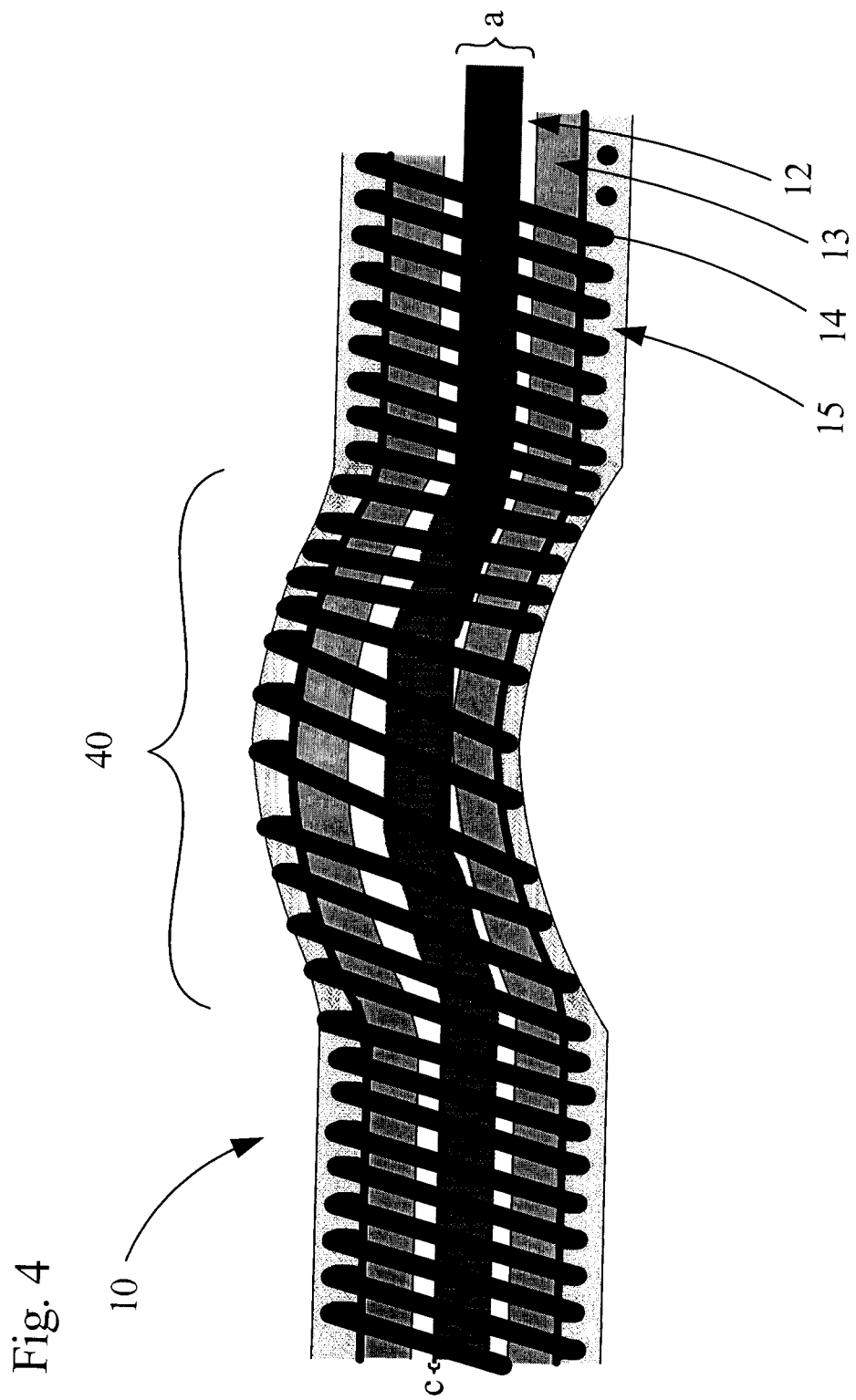
FIG. 4 is a cross-sectional side view of the embodiment shown in FIG. 1 responding to prolonged exposure to a small leak from a pipeline resulting in increasing softening of the chemically frangible material and increasing release of torsioning and tensile forces from the coiled spring thereby causing a more pronounced bending and distortion of the fiber optic waveguide and reduction of the optical signal strength as schematically (i.e. symbolically) represented by "a" and "c"

The leakage-induced changes in the intensity of fiber optic light transmission are detectable and measurable by an OTDR (not shown) and will enable precise identification of the location of the leak, as well as information on the magnitude of the leak. Prolonged exposure to a small and slow leak, or alternatively, exposure to a larger leak will result in the degradation and disappearance of a larger area of embedding material 15 as shown by area 40 in FIG. 4, thereby allowing larger tensile and twisting forces to be applied to the fiber optic waveguide 11 which results in a greater degree of interference with fiber optic light transmission as measurable by significantly reduced light intensity measurements (represented by area "c" in FIG. 4) as compared to the light source (represented by area "a" in FIG. 4). Major leakage events will result in significant degradation and losses of the embedding material 15 as shown by area 50 in FIG. 5. In these types of events, significant portions of tensioned coiled spring 14 are released resulting in significant deformation of the fiber optic waveguide 11 in response to the severe tensile and/or twisting forcing causing a "cutting" of the fiber optic waveguide and complete blockage of light transmission.

Figure 5:
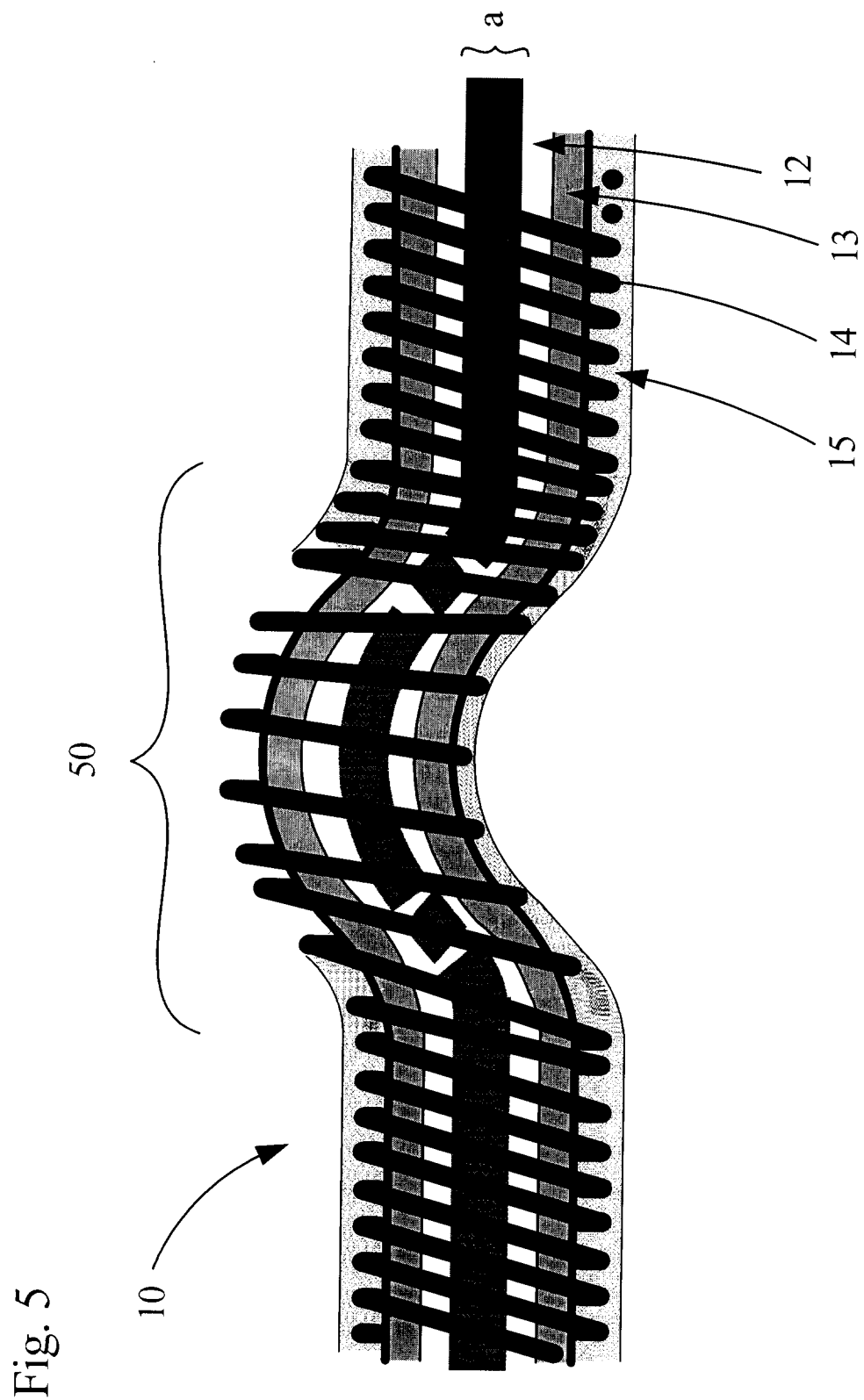
FIG. 5 is a cross-sectional side view of the embodiment shown in FIG. 1 responding to exposure to a large leak or alternatively, a very prolonged exposure to a small leak.
Figure 6A:
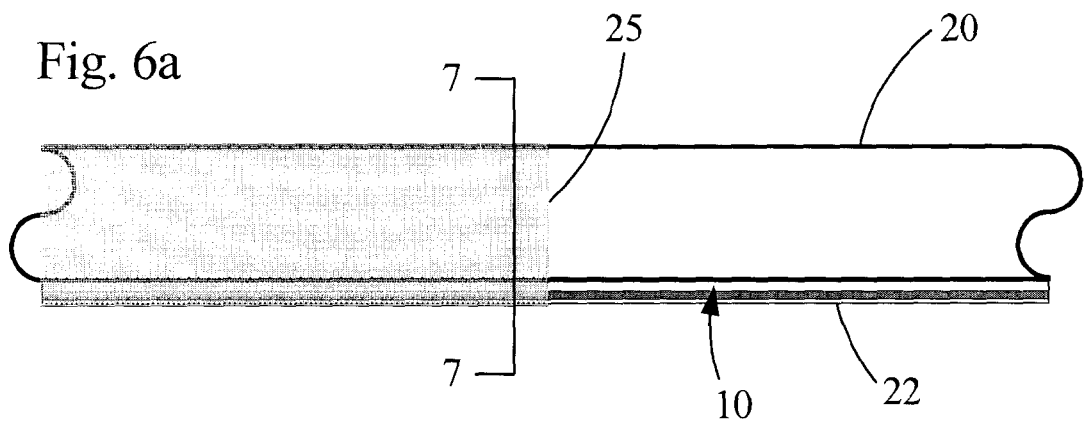
FIG. 6a is a partial cut-away cross-sectional side view of a pipeline fitted with an embodiment of the present invention.
Figure 6B:
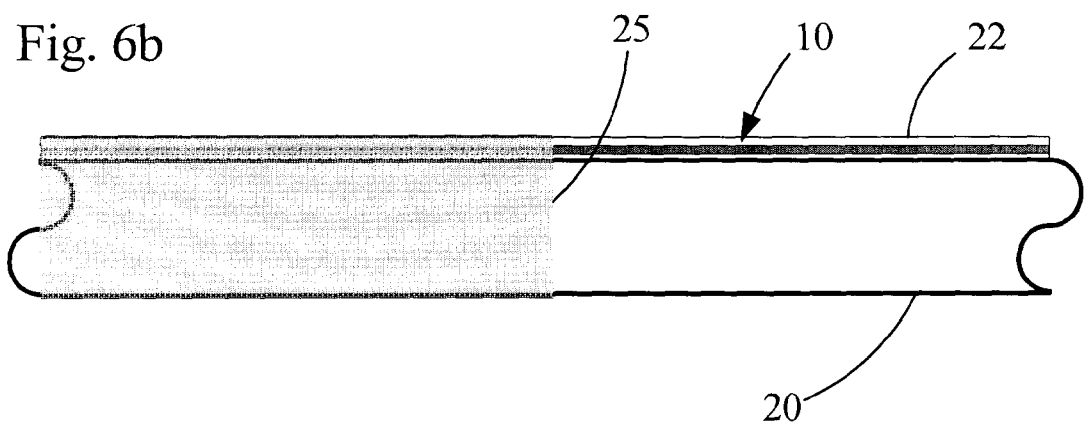
FIG. 6b is a partial cut-away cross-sectional side view of a pipeline fitted with another embodiment of the present invention.
Figure 6C:
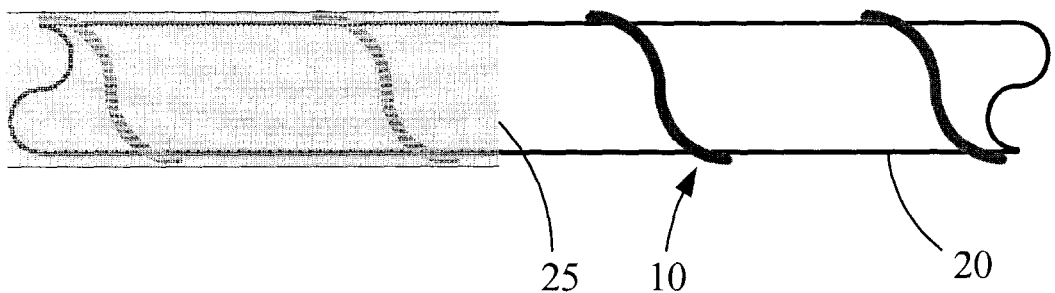
FIG. 6c is a partial cut-away cross-sectional side view of a pipeline fitted with yet another embodiment of the present invention.

It is essential that the integral body-fused leakage-sensing device is installed loosely adjacent to a pipeline to be monitored so that in the event of a pipeline leakage causing destabilization and disintegration or dissipation of the chemically frangible embedding material to the point where the tensioned coiled spring is released from the leakage-sensing device, sufficient space is provided for the tensioned spring to uncoil, elongate, twist and undulate about the fiber optic waveguide to deform and deflect laser light transmission (shown symbolically as "b" and "c" in FIGS. 3 and 4 respectively) detectable by an OTDR, and in severe or prolonged leakage events to break light transmission and back-reflection as shown in FIG. 5. Therefore, it may be desirable, as shown in FIGS. 6a, 6b, and 7, to provide a porous and somewhat-flexible conduit 22 for encasing the integral body-fused leakage-sensing device 10 prior to installation of the leakage-sensing device 10 adjacent to a pipeline 20. It is essential that the porous conduit 22 comprises a durable material which is not chemically affected by exposure to the chemical materials conveyed within the pipeline. It is desirable that the porous conduit 22 is provided with regularly spaced vents or holes or channels to enable leaking materials to quickly, readily and easily contact and affect the leakage-sensing device 10. The porous conduit 22 containing the leakage-sensing device 10 therein may be installed by juxtapositioning underneath and adjacent the pipeline as shown in FIG. 6a, to detect leakages of liquid materials or gaseous materials that are heavier than air. Alternatively, the porous conduit 22 containing the leakage-sensing device 10 therein may be installed by juxtapositioning above and adjacent to the pipeline as shown in FIG. 6b, to detect leakages of gaseous materials that are lighter than air. Alternatively, the leakage-sensing device 10 may be installed by wrapping around a pipeline without the porous conduit as shown in FIG. 6c or with the porous conduit (not shown).

As shown in FIGS. 6a, 6b, 6c and 7, it is further preferred to provide a protective non-porous covering 25 about a pipeline 20 provided with the leakage-sensing device 10 of the present invention, to contain therein any leaking materials from the pipeline. The protective covering 25 may comprise any suitable durable material that will withstand environmental conditions and weather fluctuations of the regions through which the pipeline is installed. Examples of suitable protective coverings include durable plastic sheeting, aluminum piping, fabric tubing reinforced with penetration proof materials such as Kevlar® (trade mark of E. I. Du Pont de Nemours and Co.) or carbon fibers. It is preferred that the protective covering 25 ensheaths the leakage-sensing device 10 adjacent to the pipeline 20. Alternatively, the integral body-fused leakage-sensing device 10 may be installed: (a) directly underneath a pipeline for contacting and detecting liquids and heavier-than-air gases that may leak from the pipeline, or (b) directly above the pipeline for contacting and detecting lighter-than-air gases that may leak from the pipeline. It is to be noted that in these types of applications, much shorter lengths of the leakage-sensing device is required for satisfactory installation compared to installations that wrap the leakage-sensing device around a pipeline.

Figure 8:
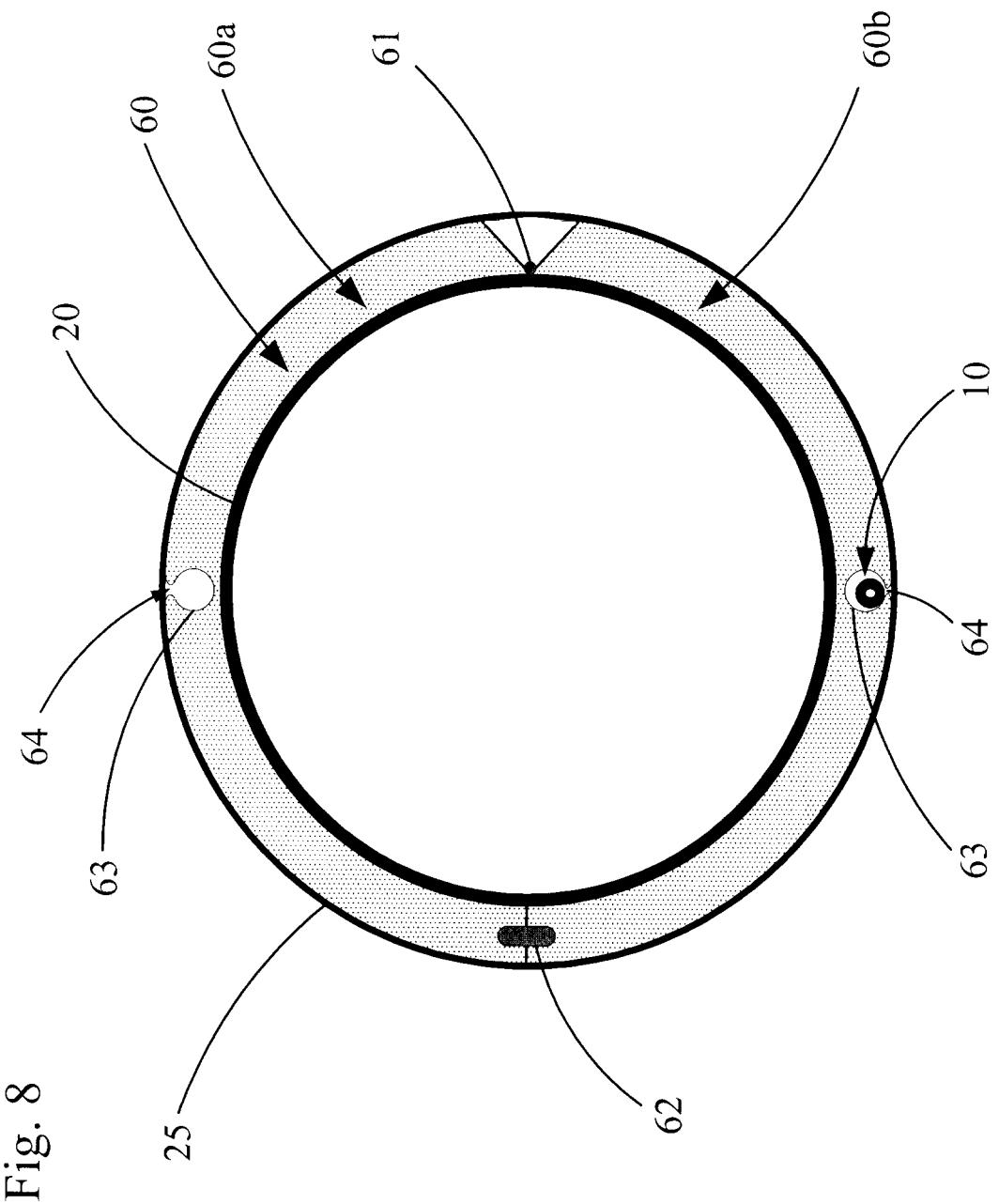
FIG. 8 is an end view of a pipeline fitted with another embodiment of the present invention.

Another preferred embodiment for installation of the leakage-sensing device of the present invention is shown in FIG. 8 wherein a 2-arm collar 60 is fastened about a pipeline 20. The collar 60 is provided with a hinge 61 to permit easy encircling of collar arms 60a around the pipeline 20, and also is provided with a clasp 62 for interconnecting the two arms 60a of collar 60. Each arm 60a of collar 60 is provided with a slotted aperture 63 configured with a slot 64 for retainingly receiving therethrough the leakage-sensing device 10 of the present invention. Alternatively, one-piece plastic collars (not shown) may be designed to "snap" around a pipeline. It is preferable that such one-piece collars are provided with an aperture configured with a slot sized to retainingly receive a leakage-sensing device 10 therethrough. Multiple spaced-apart collars 60 are fastened onto the pipeline 20 after which, the leakage-sensing device 10 is threaded through aperture 63 of adjacent collars 60 after which, a protective covering 25 is installed in a manner to sealably encase pipeline 20 and leakage-sensing device 10.

If so desired or necessitated by environmental conditions, the leakage-sensing device 10 may be installed between the inner and outer walls of doubled-wall piping systems (not shown). Those skilled in this art will understand that the leakage-sensing device 10 should be mounted: (a) underneath or near the bottom of a pipeline 50 as shown in FIG. 8 in order to detect leakages of liquid fuel stocks and gaseous fuel stock that is heavier than air conveyed through the pipeline, and (b) at or near the top of a pipeline (not shown) in order to detect leakages of gaseous fuel stocks that are lighter than air conveyed through the pipeline. Alternatively, the leakage-sensing device 10 may be wound around the circumference of a pipeline over an extended distance. Although the leakage-sensing device of the present invention is particularly suited for monitoring pipelines configured to convey liquid or gaseous fuel stocks over extended distances, the device is also amenable for installation along convoluted piping infrastructure systems as exemplified by refineries and chemical synthesis plants.

The leakage-sensing device 10 of the present invention provides an integral-body fuse system along the entire length of a fiber optic waveguide encompassed by the chemically frangible embedding material 15. The device is compatible with long-distance single-mode (SM) fiber optic cables with operational reaches in excess of 200 km. Because the entire length of the leakage-sensing device is provided with a tensioned coiled spring encased in a chemically frangible material, a leak at any location of a pipeline equipped with the sensing device will be detected and precisely located along the entire 200-km reach of the fiber optic light energy source. Furthermore, the sensitivity provided by the use of chemically frangible embedding materials enables detection, locating and analyses of very small leaks thereby enabling maintenance work to be done to repair or replace the leaking area in a timely manner.

The configuration of the leakage-sensing device of the present invention facilitates ease of replacement of sections of the device that have been exposed to leakage such that the frangible embedding material has been compromised. The section of the leakage-sensing device that has been "blown" by contacting of the chemically frangible material with the leaking chemical materials is cut away and replaced with an intact length of replacement leakage-sensing device using methods and equipment commonly used for repair and/or splicing together of fiber optic cables used in telecommunications. An exemplary repair process may consist of the following steps:

1. Cut out the section of the integral body-fused leakage-sensing device that has "blown", i.e., wherein the frangible embedding material has been degraded thereby releasing the coiled spring. Sufficient lengths of the device should be removed on either side of the "blown" site to ensure that all compromised embedding material is removed.
2. Cut a replacement length of the leakage-sensing device that is slightly longer than the section that has been cut out. This extra length is needed to allow for splicing-in of the replacement section of the integral body-fused leakage-sensing device.
3. Prepare the two ends of the leakage-sensing device that remain in the pipeline. A short section (e.g. 50 mm) of the tensioned coil-spring is removed from the fiber-optic 'fuse' together with the buffering layer, and the single-mode fiber-optic waveguide with a thin protective coating that is applied as a matter of course during its manufacturing process) is exposed.
4. Prepare the two ends of the replacement leakage-sensing device in an identical manner.

5. Prepare the ends of the single-mode fiber-optic waveguide for fusing repair by removing the protective coating with a suitable solvent. (There are four ends in total.) Cleave the ends of the fiber-optic waveguide to provide a flat face that is suitable for fusing.
6. Using fiber-optic fusing equipment that is known to those skilled in this art, fuse one end of the single-mode fiber-optic waveguide of the replacement leakage-sensing device to one end of the single-mode fiber-optic waveguide of the leakage-sensing device that still remains in place.
7. After fusing the two ends of the single-mode fiber optic waveguide, the thin protective coating should be restored by a simple painting process wherein the painting material is a UV-cured epoxy material or a two-component epoxy.
8. Repeat the steps for the remaining two ends of the single-mode fiber-optic waveguide.
9. Injection mould a piece of plastic material around the fused sections of the single-mode fiber-optic waveguides, to the same dimensions of the original leakage-sensing device. These moulded sections can be shorter than 100 mm. Since they will have no coiled-springs installed, these moulded sections will not act as a "fuse", but the remainder of the leakage-sensing device will still be "armed" and such a short "dead-zone" is not a significant drawback. It should be noted that since the tensioned coiled-spring is still encased in the frangible embedding material, there is no danger of it unraveling (i.e. uncoiling) during the repair process.

While this invention has been described with respect to the preferred embodiments, it is to be understood that various alterations and modifications can be made to the various modules, components, and configurations of the pipeline leakage sensing device within the scope of this invention.

The invention claimed is:

1. A leakage-sensing device for installation adjacent to a transmission pipeline configured for conveying a selected material therein, said leakage-sensing device comprising:
   a first length of cable configured to transmit and back-reflect light energy therethrough, said cable communicable with a signal-generating device and a signal-measuring device;
   a stressed coiled biasing element circumscribing said length of cable; and
   a chemically frangible casing configured for encasing and embedding therein the length of cable circumscribed by the stressed coiled biasing element, said chemically frangible casing selected for its structural instability when contacted with said conveyed material thereby releasing the stress on said coiled biasing element.

2. A leakage-sensing device according to claim 1, wherein the first length of cable circumscribed by the stressed coiled biasing element and encased by the chemically frangible casing is splicable to a second length of cable configured to transmit and back-reflect signals therethrough thereby communicable with the first length of cable and a signal-generating device and a signal-measuring device, said second length of cable circumscribed by a stressed coiled biasing element and encased by a chemically frangible casing selected for its structural instability when contacted with said conveyed material.

3. A leakage-sensing device according to claim 1, wherein the first length of cable is a fiber optic cable.

4. A leakage-sensing device according to claim 3, wherein the fiber optic cable is cooperative with a fiber optic waveguide.

5. A leakage-sensing device according to claim 1, wherein the coiled biasing element is stressed by a force selected from the group comprising tensioning forces and stretching forces.

6. A leakage-sensing device according to claim 1, wherein the coiled biasing element is stressed by a force selected from the group comprising torsioning forces and compressive forces.

7. A leakage-sensing device according to claim 1, wherein the coiled biasing element is stressed by a plurality of forces selected from the group comprising tensioning forces, stretching forces, and compressive forces.

8. A leakage-sensing device according to claim 1, wherein the chemically frangible casing is thermostable in a temperature range between $-70°$ C. to $+70°$ C.

9. A leakage-sensing device according to claim 8, wherein the chemically frangible casing is structurally unstabilized when contacted with a material selected from the group comprising liquids and gases.

10. A leakage-sensing device according to claim 9, wherein the chemically frangible casing is structurally unstabilized when contacted with a liquid material selected from the group comprising water, alcohols, acids, bases, and hydrocarbon-containing fluids.

11. A leakage-sensing device according to claim 10, wherein the chemically frangible casing is structurally unstabilized when contacted with water.

12. A leakage-sensing device according to claim 10, wherein the chemically frangible casing is structurally unstabilized when contacted with an alcohol.

13. A leakage-sensing device according to claim 10, wherein the chemically frangible casing is structurally unstabilized when contacted with an acid.

14. A leakage-sensing device according to claim 10, wherein the chemically frangible casing is structurally unstabilized when contacted with a base.

15. A leakage-sensing device according to claim 10, wherein the chemically frangible casing is structurally unstabilized when contacted with a hydrocarbon fluid from the group comprising crude oil, refined oil, gasoline, diesel oil, and refined petroleum products.

16. A leakage-sensing device according to claim 9, wherein the chemically frangible casing is structurally unstabilized when contacted with a gaseous material from the group comprising methane, ethane, butane, propane, carbon dioxide, nitrogen, nitrous oxide, nitrous dioxide, ammonia, helium, hydrogen sulfide, and sulfur dioxide, and halides.

17. A leakage-sensing device according to claim 9, wherein the chemically frangible casing is structurally unstabilized when contacted with a mixture of gaseous material from the group comprising quantities of methane, ethane, butane, propane, carbon dioxide, nitrogen, nitrous oxide, nitrous dioxide, ammonia, helium, hydrogen sulfide, and sulfur dioxide, and halides.

18. A leakage-sensing device according to claim 9, wherein the chemically frangible casing is structurally unstabilized when contacted with methane.

19. A process for producing the leakage-sensing device of claim 1, the process comprising:
   circumscribing a length of cable configured to transmit and back-reflect light energy therethrough, said cable communicable with a signal-generating device and a signal-measuring device, with a coiled biasing element;
   applying a stress to said coiled biasing element;
   applying a viscous fluid material to encase said cable and said stressed coiled biasing element circumscribing said cable, said viscous fluid material configured to dry after application to form a chemically frangible casing that loses its structural stability when contacted with a selected material.

20. A process according to claim 19, wherein the cable is configured to transmit and back-reflect laser energy.

21. A process according to claim 19, wherein the cable is a fiber optic cable.

22. A process according to claim 21, wherein the fiber optic cable is cooperative with a fiber optic waveguide.

23. A process according to claim 19, wherein the coiled biasing element is stressed by a force selected from the group comprising tensioning forces and stretching forces.

24. A process according to claim 19, wherein the coiled biasing element is stressed by a force selected from the group comprising torsioning forces and compressive forces.

25. A process according to claim 19, wherein the coiled biasing element is stressed by a plurality of forces selected from the group comprising tensioning forces, stretching forces, and compressive forces.

26. A process according to claim 19, wherein the chemically frangible casing is thermostable in a temperature range between −70° C. to +70° C.

27. A process according to claim 26, wherein the chemically frangible casing is structurally unstabilized when contacted with a liquid material selected from the group comprising water, alcohols, acids, bases, and hydrocarbon-containing fluids.

28. A process according to claim 26, wherein the chemically frangible casing is structurally unstabilized when contacted with a hydrocarbon fluid from the group comprising crude oil, refined oil, gasoline, diesel oil, and refined petroleum products.

29. A process according to claim 26, wherein the chemically frangible casing is structurally unstabilized when contacted with a gaseous material from the group comprising methane, ethane, butane, propane, carbon dioxide, nitrogen, nitrous oxide, nitrous dioxide, ammonia, helium, hydrogen sulfide, and sulfur dioxide, and halides.

30. A process according to claim 26, wherein the chemically frangible casing is structurally unstabilized when contacted with a mixture of gaseous material from the group comprising quantities of methane, ethane, butane, propane, carbon dioxide, nitrogen, helium and hydrogen sulfide.

31. A process according to claim 26, wherein the chemically frangible casing is structurally unstabilized when contacted with methane

* * * * *